United States Patent [19]

Thuler

[11] 4,020,203

[45] Apr. 26, 1977

[54] LUMINOUS MARKING IN AN INDENTATION OF AN OBJECT

[76] Inventor: Oscar Thuler, Freiburgstrasse 624, 3172 Niederwangen, Berne, Switzerland

[22] Filed: Mar. 27, 1975

[21] Appl. No.: 562,516

[30] Foreign Application Priority Data

| | | |
|---|---|---|
| May 22, 1974 | Switzerland | 7056/74 |
| June 15, 1973 | Switzerland | 8751/73 |

[52] U.S. Cl. .................................... 428/35; 428/67; 428/417; 428/428; 427/66; 252/301.6 S

[51] Int. Cl.$^2$ ....................... B32B 3/08; B32B 3/10; C09K 11/00; H05B 33/00

[58] Field of Search ............... 427/66; 428/917, 35, 428/67, 45, 131, 417, 428; 252/301.1, 301.2 R, 301.3 R, 301.6 S

[56] References Cited

UNITED STATES PATENTS

| | | | |
|---|---|---|---|
| 3,316,109 | 4/1967 | Rimbach | 252/301.3 R |
| 3,342,743 | 9/1967 | Rosenberg | 252/301.3 R |
| 3,366,573 | 1/1968 | Feuer | 252/301.3 R |
| 3,436,242 | 4/1969 | Schaffner | 428/917 X |
| 3,456,043 | 7/1969 | Emery | 428/917 X |
| 3,668,455 | 6/1972 | Dale et al. | 428/35 X |
| 3,908,055 | 9/1975 | Susuki et al. | 428/67 |

*Primary Examiner*—Philip Dier

*Attorney, Agent, or Firm*—Blum, Moscovitz, Friedman & Kaplan

[57] ABSTRACT

A luminous mark on an object is provided by a phosphor and a source of nuclear radiation in an indentation of the object, the materials being held in place by a transparent cover closing said indentation.

15 Claims, 4 Drawing Figures

FIG. 1
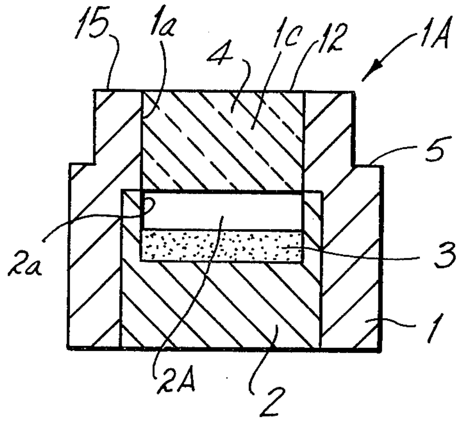
FIG. 4
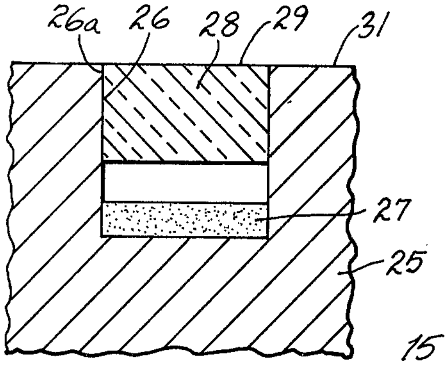
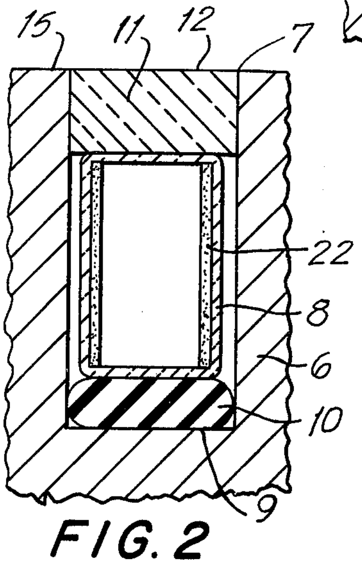
FIG. 2
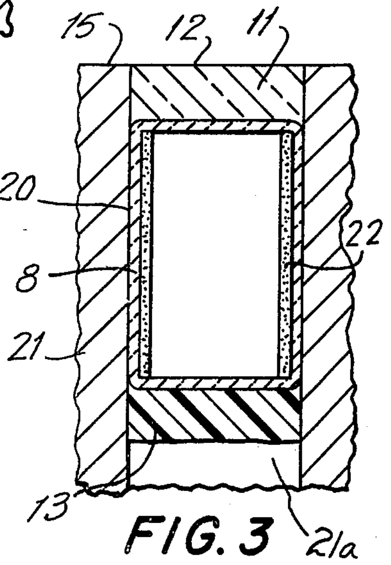
FIG. 3

LUMINOUS MARKING IN AN INDENTATION OF AN OBJECT

BACKGROUND OF THE INVENTION

In conventional luminous marking techniques, a metal or plastic segment of an object to be marked is provided with a small indentation or is countersunk. Into an indentation is placed a small quantity of a phosphorescent material and a source of nuclear radiation. In order to meet requirements imposed by the law, a protective cover must be provided to prevent direct contact with the radioactive material. A standard practice has been to use a plastic material as the cover. Also, it has been conventional to make the indentation containing the radioactive material sufficiently deep so that the exterior of the cover lies at a lower level than the surface of the surrounding object. Because the indentation and the cover are generally of small diameter, say about 2 mm, direct contact with the cover is not apt to occur. However, it has been found that if the object having one or more luminous markings is handled roughly or is used outdoors as is the case with a weapon, or if the object is exposed to abrasive materials, then a plastic cover may be damaged.

A more serious problem arises from the fact that the temperature coefficient of expansion of plastics is much larger than that of metals. Consequently, if the object is subjected to large changes in temperature as may be the case with a weapon which is fired many times in quick succession, then the plastic cover may fail to maintain effective closure over the indentation, eventually permitting escape of nuclear radiation.

SUMMARY OF THE INVENTION

Where an object to be provided with a luminous marking has an indentation therein, a phosphor and a source of nuclear radiation are placed in the indentation and the mouth of the indentation is sealed with an artificial sapphire of appropriate shape and size, the outer surface of the sapphire cover being essentially flush with the surface of the object.

In another embodiment the phosphor is in a sealed glass capsule which also contains a source of nuclear radiation. The capsule is seated on a resilient material such as rubber and the mouth of the indentation is again sealed with a sapphire so dimensioned that its outer surface is essentially flush with the surface of the object and its inner surface bears on the glass capsule.

Preferred luminescent materials are zinc sulfide, cadmium sulfide and mixtures thereof. Preferred sources of nuclear radiation are metal carbonates containing $C^{14}$ and, where a glass capsule is used, tritium. Krypton may also be used as the source of nuclear radiation in a glass capsule.

Accordingly, an object of the present invention is a luminous marking on an object where the luminescence is provided by a phosphor and a source of nuclear radiation in an indentation or an aperture in the object, protection against contamination by the nuclear material being provided by a sapphire.

Another object of the present invention is a luminous marking in an object where a sapphire is mounted in an indentation or aperture so that its exterior surface is essentially flush with the surface of the object.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a sectional view of an embodiment of the invention wherein a sapphire provides protection against contact with or exposure to a radioactive material positioned within a sleeve;

FIG. 2 is a sectional view of an embodiment of the invention wherein a radioactive material and a phosphor are enclosed in a glass capsule seated in an indentation in an object to be marked;

FIG. 3 is a sectional view of an embodiment in which a glass capsule is held in place in an aperture in an object between a transparent sapphire cover and a seal of cast and hardened organic resin;

FIG. 4 is a sectional view of an embodiment wherein a radioactive material and a phosphor are positioned in an indentation in an object to be marked, said indentation being sealed by a transparent sapphire cover flush with the cover of said object.

DESCRIPTION OF THE PREFERRED EMBODIMENTS

The embodiment of the invention shown in FIG. 1 is particularly suitable for use in relatively shallow objects where it is desired to make specific points or regions conspicuous. Thus, said embodiment would be useful for indicating conspicuously a point upon a dial beyond which the indicator, such as a needle, should not travel, excursion beyond said point being taken as an indication that the device being monitored by the meter including the luminously-marked dial and the needle has exceeded the range of safe operation.

The construction of the embodiment of FIG. 1 is simple and inexpensive. The sleeve, generally indicated by the reference numeral 1A, includes annular member 1 which can be of any suitable metal but preferred, are brass, nickel-silver and corrosion-resistant aluminum alloys.

Plug 2, preferably of the same metal as member 1, is positioned within aperture 1C of member 1 and has a pocket 2A therein in which are placed a phosphor and a solid source of nuclear radiation 3. Suitable phosphors are zinc sulphide, cadmium sulphide and mixtures thereof. Suitable sources of nuclear radiation, also to be termed activators, are metal carbonates containing $C^{14}$. Examples are the sodium, lithium, potassium, barium and calcium carbonates. Barium carbonate is particularly satisfactory due to its low solubility in water. The luminous composition formed of the phosphor and the activator are held in the pocket of plug 2 by a binding agent. Generally the luminous composition is held in place by a binder consisting of a transparent organic synthetic resin such as polyvinyl alcohol, styrene or methyl-methacrylate. Preferably interior walls 1a and 2a should be reflecting, either specularly or diffusely.

It is necessary that the luminous source be protected from entry of moisture, and particularly of entry of acid since an acid of any appreciable strength would displace the carbonate ion, thereby destroying the activator. For this purpose transparent cover 4 of artificial sapphire is inserted into the mouth of the aperture 1c in member 1. Sapphire cover 4 makes an interference fit with wall 1a in member 1 and should be positioned so that the outer surface 12 of sapphire cover 4 is essentially flush with the adjacent surface 15 of member 1. Preferably member 1 is annular, as aforenoted, and the indentations therein are also annular, i.e., cylindrical. Sapphire cover 4 is therefore also cylindrical. The diameter of cover 4 should be about 2mm and said cover is disc-shaped.

Sleeve 1A holding plug 2 and cover 4 is designed for insertion into an aperture in an object (not shown). Shoulder 5 may be used during the positioning of the assembly in the object.

Activation by means of $C^{14}$ is particularly suitable for the purposes of the present invention due to the fact that it is a source of pure beta-radiation having a maximum energy of 155 KeV and a half-life of 5570 years.

It is clear that a sapphire crystal cover will withstand essentially all chemical and mechanical effects as well as high temperature and temperature changes. In addition, the fact that the sapphire crystal is so small, namely, about 2 mm., results in resistance of the crystal to rotation or other displacement. Moreover, when the outer surface 12 of crystal 4 and the adjacent surface 15 of member 1 and the surface of the object are flush, then cleaning of the crystal surface presents no problem. The inorganic crystal cover in interference fit with the mouth of the indentation gives complete protection against escape of the carbon activator from the device. So far as absorption of the beta-radiation is concerned, a sapphire crystal cover is several orders of magnitude more effective than plastic which is frequently used. This is due in part to the considerably higher specific gravity of the inorganic material which for a sapphire crystal is about 400 $mg/cm^2$ per millimeter of thickness compared to about 50 $mg/cm^2$ for the usual plastic cover which is about 0.5 mm thick. The higher absorption of sapphire than plastic in the region of interest is due to the fact that the absorption of radiation is proportional to the fifth power of the atomic number of the absorbing material. The principal atomic numbers in plastics are 6 for carbon and 1 for hydrogen whereas for sapphire they are 13 for aluminum and 8 for oxygen.

It is not necessary to provide a special case-like insert to obtain luminous markings in accordance with the present invention. The preferred method is to use an indentation, that is countersinking, made directly in a surface of the object which is to be marked luminously. A dot of luminescent material can then be placed in this indentation and covered by a sapphire crystal using an interference fit. This technique is especially suitable for instruments, as aforenoted, especially where they are unlit and are to be used in the dark. Thus, they can be used on a meter, night-glasses, a telescope, etc. They can also be used in the form of dotted marks to provide a focusing point. Such a construction is shown in FIG. 4 in which object 25 has an indentation 26 therein, with luminescent composition 27 positioned in said indentation. The indentation 26 is sealed with a transparent sapphire crystal cover 28 making an interference fit with wall 26a of indentation 26. Again, surface 29 of the crystal 28 is flush with surface 31 of the object 25.

The embodiment of FIG. 2 is preferred because of the fact that the radioactive source is not exposed during preparation of the luminous markings. Object 6 which is to be fitted with a luminous marking has an indentation 7 therein in which is inserted a resilient material 10, preferably a soft rubber, which is seated at bottom 9 of the indentation in the object 6. Resting on resilient material 10 is a glass capsule 8 having a phosphor 22 held to its walls by a binder. The phosphor is preferably zinc sulphide but also may be cadmium sulphide or a mixture of the two sulphides. The capsule also contains a radioactive gas, preferably tritium, but also, may be krypton. Capsule 8 is preferably biased against resilient material 10 by crystal cover 11 mounted to be essentially flush with the surface of object 6. The object of such biasing is to increase the shock-resistance of the assembly. However, where shock and vibration will be absent, such biasing is unnecessary. Crystal cover 11 is a transparent artificial sapphire and is seated in object 6 in a press fit. The primary seal against escape of radiation is provided by the glass capsule and a secondary seal is provided by the press fit between the crystal and the mouth of the indentation. Glass capsule 8 fits slidingly within the indentation in object 6. The dimensions of the capsule can be very small, a preferred size being about 2 mm in outer diameter and 5 mm long. The result is that when viewed from any distance the marking appears to be a dot of slight or negligible depth.

In the embodiment of FIG. 3 object 21 has an indentation passing completely therethrough so that the indentation constitutes an aperture *21a*. The glass capsule 8 may be sized to make a sliding fit with the interior wall 20 of the aperture and then may be held by a crystal cover 11 press-fitted to one end of the aperture and by a hardened casting material such as a silicone resin or an epoxy resin at the other end thereof. The outer surface 12 is flush with adjacent surface 15 to avoid entrapment of dirt. The enclosures consisting of the wall 20, crystal 11 and resin 13 provide excellent protection against breakage of the capsule and consequent escape of radioactive gas. Again, it is preferred that the interior surface 20 of object 21 be reflecting, in the interest of enhancing the brightness of the illumination provided by the marker.

Preferred binders for the phosphor 22 in the glass capsule are orthophosphoric acid and sodium and potassium silicate. These binders are inorganic and do not darken under the effect of the nuclear radiation.

It will thus be seen that the objects set forth above, among those made apparent from the preceding description are efficiently attained and, since certain changes may be made in the above article without departing from the spirit and scope of the invention it is intended that all matter contained in the above description and shown in the accompanying Drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. Luminous marking on an object, said object having an indentation therein, comprising a phosphor in said indentation, a source of nuclear radiation in said indentation and an artificial, transparent sapphire crystal shaped to conform to the mouth of said indentation and to form a seal for confining said phosphor and source of nuclear radiation within said indentation and for preventing entry of corrosives or acids from the exterior, the outer surface of said sapphire crystal being essentially flush with the outer surface of said object at said indentation.

2. The luminous marking as defined in claim 1, wherein said phosphor is an inorganic compound selected from the group consisting of ZnS, CdS and mixtures thereof.

3. The luminous marking as defined in claim 1, wherein said source of nuclear radiation is a metal carbonate containing $C^{14}$.

4. The luminous marking as defined in claim 1, wherein said metal carbonate is $BaCO_3$.

5. The luminous marking as defined in claim 1, wherein said crystal makes an interference fit with the mouth of said indentation.

6. The luminous marking as defined in claim 1, wherein said object is annular and at least the interior surface of said indentation in said object is of a material selected from the group consisting of nickel, silver and a corrosion-resistant aluminum alloy.

7. The luminous marking as defined in claim 5, wherein the interior of said indentation is reflective.

8. The luminous marking as defined in claim 1, further comprising a sealed glass capsule, said capsule containing said phosphor and said source of nuclear radiation, and an inorganic binder for holding said phosphor against the wall of said capsule, said capsule fitting within said indentation, and a resilient material between the bottom of said indentation and said capsule.

9. The luminous marking as defined in claim 8, wherein said source of nuclear radiation is selected from the group consisting of tritium and krypton.

10. The luminous marking as defined in claim 8, wherein said capsule is biased against said resilient material by said sapphire crystal.

11. The luminous marking as defined in claim 1, wherein said indentation is an aperture passing completely through said object, said transparent sapphire crystal sealing one end of said aperture, and further comprising a glass capsule enclosing said phosphor and source of nuclear radiation, and an organic resin positioned proximate the other end of said aperture for holding said capsule within said aperture.

12. The luminous marking as defined in claim 11, wherein said organic resin is selected from the group consisting of epoxy resin and silicone resin.

13. The luminous marking as defined in claim 11, wherein said phosphor is selected from the group consisting of ZnS, CdS and mixtures thereof.

14. The luminous marking as defined in claim 11, wherein said source of nuclear radiation is selected from the group consisting of tritium and krypton.

15. The luminous marking as defined in claim 1, wherein said indentation is cylindrical in cross-section and said sapphire is a disc.

* * * * *